(12) United States Patent
Kim

(10) Patent No.: US 10,752,041 B2
(45) Date of Patent: Aug. 25, 2020

(54) WEB AUTHENTICATION HOLOGRAPHIC LABEL AND METHOD FOR MANUFACTURING SAME

(71) Applicant: RMG Co., Ltd., Gunpo, Gyeonggi-do (KR)

(72) Inventor: Hee Jung Kim, Euiwang-si (KR)

(73) Assignee: RMG Co., Ltd., Gunpo, Gyeonggi-do (KR)

( * ) Notice: Subject to any disclaimer, the term of this patent is extended or adjusted under 35 U.S.C. 154(b) by 0 days.

(21) Appl. No.: 16/462,397

(22) PCT Filed: Nov. 14, 2017

(86) PCT No.: PCT/KR2017/012902
§ 371 (c)(1),
(2) Date: May 20, 2019

(87) PCT Pub. No.: WO2018/093122
PCT Pub. Date: May 24, 2018

(65) Prior Publication Data
US 2019/0283481 A1    Sep. 19, 2019

(30) Foreign Application Priority Data

Nov. 18, 2016 (KR) .................. 10-2016-0153843

(51) Int. Cl.
| | | |
|---|---|---|
| B42D 25/328 | (2014.01) | |
| G06F 3/00 | (2006.01) | |
| G09F 3/03 | (2006.01) | |
| G03H 1/00 | (2006.01) | |
| G09F 3/10 | (2006.01) | |

(Continued)

(52) U.S. Cl.
CPC ......... *B42D 25/328* (2014.10); *B42D 25/373* (2014.10); *B42D 25/378* (2014.10); *B42D 25/44* (2014.10); *B42D 25/47* (2014.10); *G03H 1/00* (2013.01); *G03H 1/0011* (2013.01); *G09F 3/00* (2013.01); *G09F 3/02* (2013.01); *G09F 3/0297* (2013.01); *G09F 3/03* (2013.01); *G09F 3/10* (2013.01); *G06K 19/06037* (2013.01); *G09F 2003/0213* (2013.01)

(58) Field of Classification Search
CPC ...... B42D 25/328; B42D 25/47; B42D 25/44; B42D 25/378; B42D 25/373; G09F 3/00; G09F 3/03; G09F 3/10; G09F 3/0297; G09F 3/02; G09F 2003/0213; G03H 1/00; G03H 1/0011; G06K 19/06037
USPC .............. 283/67, 70, 72, 74, 91, 94, 98, 901
See application file for complete search history.

(56) References Cited

U.S. PATENT DOCUMENTS

2005/0230960 A1* 10/2005 Bilodeau ............... G09F 3/0292
283/75

FOREIGN PATENT DOCUMENTS

KR    10-2013-0033689 A    4/2013

* cited by examiner

*Primary Examiner* — Justin V Lewis
(74) *Attorney, Agent, or Firm* — Mintz Levin Cohn Ferris Glovsky and Popeo, P.C.; Steven M. Jensen

(57) ABSTRACT

The present invention relates to a web authentication hologram label and a method for manufacturing the same, and more particularly, to a web authentication hologram label and a method for manufacturing the same which in forming a web authentication label for identifying a genuine article, enable enhancement of a forgery (and falsification) preventing function as well as duplicate authentication for confirm- (Continued)

ing whether or not an article is genuine to be substantially impossible by means of adopting one-time authentication.

3 Claims, 2 Drawing Sheets

(51) Int. Cl.
*G09F 3/02* (2006.01)
*B42D 25/373* (2014.01)
*B42D 25/378* (2014.01)
*B42D 25/44* (2014.01)
*B42D 25/47* (2014.01)
*G09F 3/00* (2006.01)
*G06K 19/06* (2006.01)

WEB AUTHENTICATION HOLOGRAPHIC LABEL AND METHOD FOR MANUFACTURING SAME

CROSS-REFERENCES TO RELATED APPLICATIONS

This application is a U.S. national phase application, pursuant to 35 U.S.C. § 371, of PCT/KR2017/012902, filed Nov. 14, 2017, designating the United States, which claims priority to Korean Application No. 10-2016-0153843, filed Nov. 18, 2016. The entire contents of the aforementioned patent applications are incorporated herein by this reference.

TECHNICAL FIELD

The present invention relates to a web authentication hologram label and a method for manufacturing the same, and more particularly, to a web authentication hologram label and a method for manufacturing the same which in forming a web authentication label for identifying a genuine article, enable enhancement of a forgery (and falsification) preventing function as well as duplicate authentication for confirming whether or not an article is genuine to be substantially impossible by means of adopting one-time authentication.

BACKGROUND ART

Recently, despite the global recession, due to the forgery industry, which is growing alone, customers to be swindled by mistaking and buying a counterfeit for a genuine are increasing and property losses and damaged images of companies that produce genuine articles to be forged are significant.

As a result, as a method for authenticating its luxury goods, a manufacturer has used various methods such as labeling a barcode, a QR code, a radio frequency identification (RFID), and a hologram tag.

The hologram refers to a stereoscopic image formed of a three-dimensional image and a medium for recording interference stripes which are made using a holographic principle and reproduces a stereoscopic image.

In addition, an advantage of a forgery preventing technology using the hologram is characterized by interposing and recording various information of objects (manufacture and sale of goods, etc.) on a recording material at the same time and then reproducing each information again and is a technology for enabling various security processing functions such as spatial frequency filtering, adjustment, pattern recognition, decryption, and high density storage of optical information by applying such an optical characteristic. Recently, in an embossed hologram manufacturing technology with an embossed pattern, security elements such as fine lettering, digital latent images, laser hidden images, demetallinzing, and functional materials are loaded to enhance the security.

Based on these technical ideas, in Korean Paten Publication No. 10-2013-0033689, there are a hologram printed matter and a manufacturing method thereof to have additional availability while grafting various functions of the hologram including anti-forgery by forming the hologram on a QR code or a barcode.

In the hologram printed matter and the manufacturing method thereof in the related art, the hologram printed matter includes a base sheet and a printing layer with a predetermined shaped pattern printed on the base sheet, in which a hologram image unevenness is formed on the surface of the printing layer, and the manufacturing method thereof includes: preparing a base sheet; forming a printing layer by applying a colored UV curable resin on the base sheet in a predetermined shaped pattern; making the printing layer in a semi-curable state by irradiating the printing layer with ultraviolet light; forming a hologram image unevenness by applying a pressure while contacting a hologram imprinting means to be embossed and depressed on the upper surface of the printing layer in the semi-curable state; and curing the printing layer by additionally irradiating ultraviolet light when the hologram image unevenness is formed on the printing layer.

According to the related art, in order to form patterns such as a QR code, a barcode, and various logos, since the semi-curing is performed without using general ink and the UV curable resin, which is the material of forming the precise hologram image unevenness is used in the semi-curable state, it is possible to form the hologram image unevenness on the patterns such as the QR code, the barcode, and various logos.

Further, since it is possible to exhibit various effects by a background layer and a light guide plate, it is possible to provide a printed matter grafting various functions of the hologram, including anti-forgery.

However, recently, due to the rapid advances in a software technology for image processing and hardware technologies such as computers, printers, scanners, copiers and CCD cameras, forgery and duplication are highly sophisticated, and thus the hologram printed matter in the related art, which simply adds a hologram to the QR code printing layer, also had a virtual limitation in blocking the production of forgery articles.

After all, since it is true that the existing anti-forgery techniques for forgery articles have no substantially special effect, research and development on authentication encryption technology is urgently required to resolve the negative effect of forgery and falsification faced with modern credit society as well as businesses for consumers.

SUMMARY

In order to solve the problems, an object of the present invention is to provide a web authentication hologram label and a method for manufacturing the same which enable double security by grafting variable encryption data (variable QR code, authentication code) unique to a product with a hologram.

Another object of the present invention is to provide a web authentication hologram label and a method for manufacturing the same which enhance security so that duplicate authentication (re-authentication) of the product is inherently impossible by adopting a one-time authentication method of grafting a scratch print covering the variable encryption data.

In order to achieve the objects of the present invention, there is provided a web authentication hologram label comprising: a PET film having a fresnel hologram imprinted on a UV coating layer after the UV coating layer is coated on a rear surface, as a base member of the label; a metal thin film layer deposited on the rear surface of the PET film to secure the visibility of the fresnel hologram and protect the surface of the UV coating layer; an adhesive layer coated on an outer surface of the metal thin film layer and a release paper layer coated on the adhesive layer and protecting the adhesive layer; a data printing layer printed on the front surface of the PET film to give a unique classification code and variable encryption data of a product for each hologram; an OPP film layer further coated on the front surface of the PET film to prevent the damage to the authentication information; a scratch printing layer coated on the OPP film layer at a portion where the variable encryption data is printed for one-time authentication of the authentication information and prevention of duplication authentication after one-time authentication; and a message printing layer additionally printed on the scratch printing layer with a message to prevent willful damage to the scratch printing layer.

The metal thin film layer is an aluminum thin plate deposited on an outer surface of the UV coating layer to secure visibility of the fresnel hologram engraved in a transparent state and protect the surface of the UV coating layer.

The variable encryption data is a combination of a variable QR code which is encryption authentication information unique to the product and an authentication code additionally printed on the variable QR code.

Further, there is provided a method for manufacturing a web authentication hologram label comprising: a hologram imprinting step of imprinting a fresnel hologram on a UV coating layer which is first coated on a rear surface of a PET film as a base member of the label; a thin film depositing step of coating a metal thin film on the UV coating layer of the PET film imprinted with the fresnel hologram to protect the surface of the UV coating layer while improving visibility of the fresnel hologram; a rear paper bonding step of bonding an adhesive and a release paper on the rear surface of the PET film; a data printing step of printing a unique classification code and variable encryption data for each hologram imprinted on the UV coating layer; a protective film coating step of coating an OPP film on the front surface of the PET film to protect the classification code and the variable encryption data; scratch printing step of printing a scratch on a portion where the authentication information is printed to be concealed; a guide message printing step of additionally printing a message for preventing any damage on the scratch; and a finishing step of cutting the fresnel hologram label manufactured by the respective steps in a desired size or cutting out the fresnel hologram label in a form of a sheet or a roll.

In the hologram imprinting step, the PET film is laminated by a master roll having a fresnel mirror lens and a nickel disk imprinted with the hologram and the fresnel hologram is imprinted on the UV coating layer.

As seen clearly in the description above, the web authentication hologram label of the present invention has effects of making forgery and falsification of authentication information unique to the product impossible by enhancing security according to a combination of the hologram and the variable encryption data, fundamentally blocking production of forgery products to suppress growth of the market of forgery products which is continuously increasing and protect the property rights of companies that manufacture and sell products to be a forgery, and preventing fraud damage caused by the mistaking of counterfeit goods as genuine by clearly confirming the brand of the company and product justification and purchasing the products in terms of customers.

Furthermore, the present invention is a very useful invention capable of greatly contributing to the development and activation of encryption technologies associated with web authentication by giving consumers confidence in their brand and product purchases and providing companies with brand security as well as information such as first authenticated date and region to be used for marketing.

DETAILED DESCRIPTION

Figure 1:
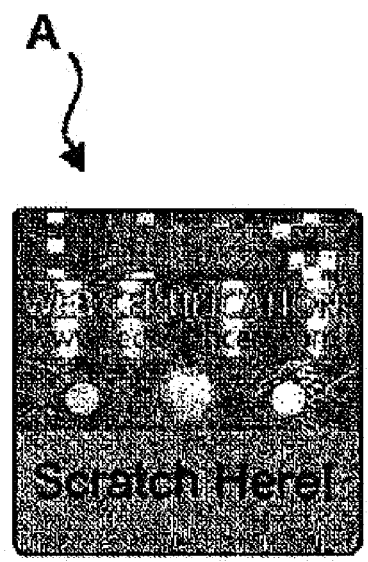
FIG. 1 is an exemplary view illustrating an embodiment of a web authentication hologram label according to the present invention.

Hereinafter, preferred embodiments of the present invention will be described in detail with reference to the accompanying drawings to the extent that a person with ordinary skill in the art to which the invention pertain is able to easily implement the present invention. First, when reference numerals refer to components of each drawing, it is to be noted that although the same components are illustrated in different drawings, the same components are denoted by the same reference numerals as possible. In the description of the present invention, a detailed explanation of related known configurations or functions will be omitted when it is determined to obscure the subject matter of the present invention.

Figure 2:
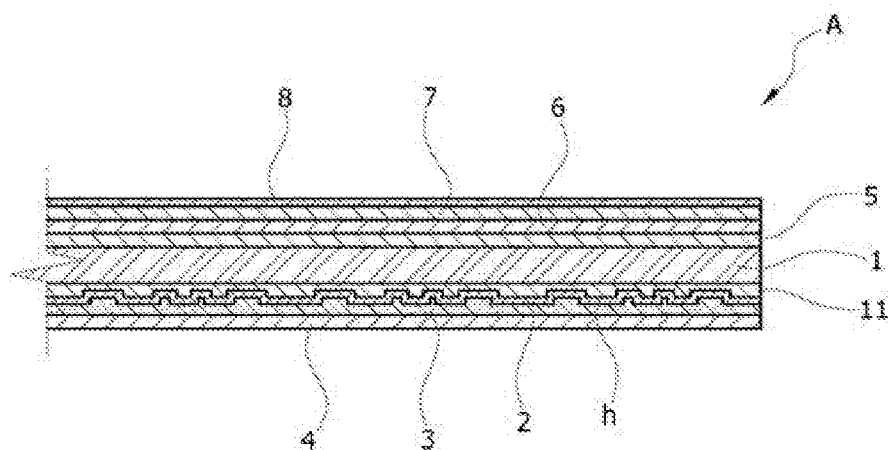
FIG. 2 is a main enlarged cross-sectional view illustrating a constitutive relation of the web authentication hologram label according to the present invention.
Figure 3:
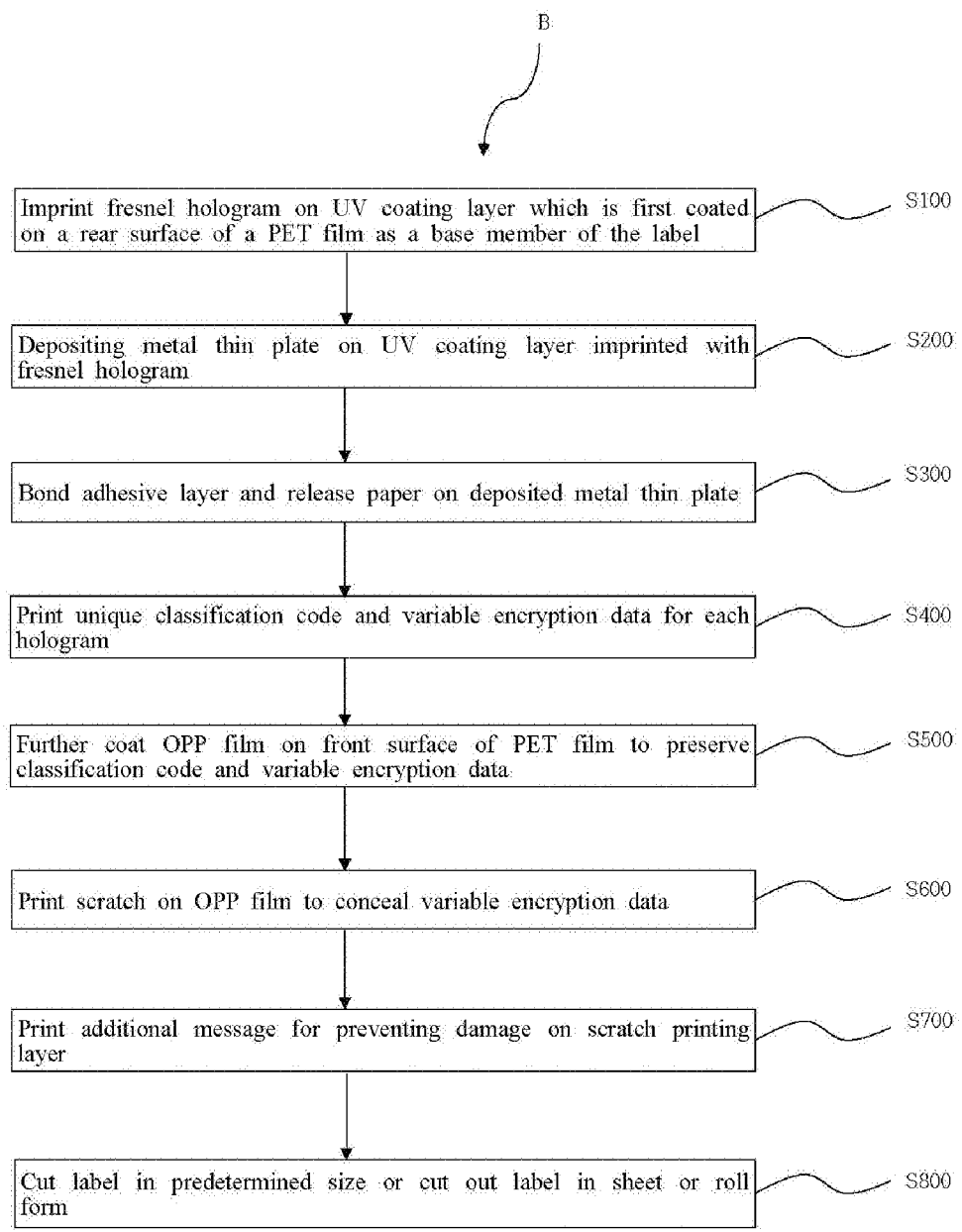
FIG. 3 is a flow chart sequentially illustrating a method for manufacturing a web authentication hologram label according to the present invention.

FIG. 1 is an exemplary view illustrating an embodiment of a web authentication hologram label according to the present invention, FIG. 2 is a main enlarged cross-sectional view illustrating a constitutive relation of the web authentication hologram label according to the present invention, and FIG. 3 is a flow chart sequentially illustrating a method for manufacturing a web authentication hologram label according to the present invention.

As illustrated in FIGS. 1 and 2, a web authentication hologram label A according to the present invention includes a polyester (PET) film 1 having a fresnel hologram h imprinted on a UV coating layer 11 after the UV coating layer 11 is coated on a rear surface as a base member of the label, a metal thin film layer 2 deposited on the rear surface of the PET film 1 to secure the visibility of the fresnel hologram h and protect the surface of the UV coating layer 11, an adhesive layer 3 coated on an outer surface of the metal thin film layer 2 and a release paper layer 4 coating and protecting the adhesive layer, a data printing layer 5 printed on the front surface of the PET film 1 to give a unique classification code and variable encryption data of a product for each hologram, an oriented polypropylene (OPP) film layer 6 further coated on the front surface of the PET film 1 to prevent the damage to the authentication information, a scratch printing layer 7 coated on the OPP film layer 6 at a portion where the variable encryption data are printed for one-time authentication of the authentication information and prevention of duplication authentication after one-time authentication, and a message printing layer 8 additionally printed on the scratch printing layer 7 with a message to prevent willful damage to the scratch printing layer 7.

As described above, the PET film 1 is the base member (basic film) of the label attached to the product to be authenticated as a genuine article and as illustrated in FIG. 1, the PET film 1 is designed as various shapes and forms according to a characteristic of the product and the UV coating layer 11 is first coated on the rear surface for smooth surface treatment and prevention of discoloration by applying a UV coating agent.

Further, the fresnel hologram may be imprinted on the UV coating layer 11 by a lamination method using a master roll with a fresnel mirror lens and a nickel (Ni) disk where the hologram is imprinted.

Here, the fresnel hologram may obtain a brighter and clearer image by unique properties of the fresnel mirror lens that cannot be obtained by engraving only a regular plane hologram, i.e. by engraving a large number of grooves on a flat plate and refracting and enlarging light on the grooves.

To this end, it is preferred that the hologram is engraved in a depth of about 0.1 micron (hereinafter, referred to as "micron"), and the fresnel mirror lens is implemented so that the hologram is deeply engraved in a depth of 8 microns and as a result, the fresnel hologram looks like a convex lens.

The metal thin film layer is to protect the surface of the UV coating layer 11 as well as to ensure the visibility of the fresnel hologram and may be an aluminum thin plate deposited for protecting the surface of the UV coating layer 11 as well as for improving sharpness so that the fresnel hologram imprinted on the UV coating layer 11 on the rear surface of the PET film 1 is visually seen clearly.

The adhesive layer 3 and the release paper layer 4 are intended to allow adhesion of the PET film 1 to be attached to a predetermined portion of the product to be confirmed as a genuine article (authenticated as a genuine article) and an adhesive forming the adhesive layer 3 may be any component for enhancing adhesion of the surface of an adhesive material.

In addition, the release paper forming the release paper layer 4 is in contact with an adhesive surface (outer surface) of the adhesive layer 3 to prevent the adhesion from being decreased and may be applied as long as the release paper exhibits characteristics capable of achieving such an object.

The data printing layer 5 is intended to give the authentication information to the hologram label and includes a classification code for confirming a distribution channel of the product and variable encryption data combined by a variable QR code on which unique authentication information and the like are recorded for each hologram to confirm the genuine article, and an authentication code additionally printed together with the variable QR code.

The OPP film layer 6 is a protective film for preventing the damage to the variable encryption data and is transparent, glossy, mechanically strong and highly moisture-resistant, so that an effect of preserving the variable encryption data printed by the data printing layer 5 is excellent.

The scratch printing layer 7 is intended to enable only one-time authentication so that the duplicate authentication of the genuine article is impossible using the variable encryption data by forming the data printing layer 5, has high concealment power as scratch off ink coated and printed on the variable QR code and the authentication code, and can completely conceal contents not to be known even in X-ray penetration.

The letter printing layer 8 is intended to display prevention of any damage of the scratch printing layer 7 and a guide message printed so that the customer can determine that one-time authentication of the genuine article before damaging the scratch printing layer 7 to confirm the variable data information by forming the data printing layer 5 and the duplicate authentication (re-authentication) after one-time authentication are impossible.

A method B for manufacturing the web authentication hologram label according to the present invention configured as above, as illustrated in FIG. 3, includes: a hologram imprinting step (S100) of imprinting a fresnel hologram on a UV coating layer which is first coated on a rear surface of a PET film as a base member of the label; a thin film depositing step (S200) of coating a metal thin film on the UV coating layer of the PET film imprinted with the fresnel hologram to protect the surface of the UV coating layer while visually viewing the fresnel hologram clearly; a rear paper bonding step (S300) of bonding an adhesive and a release paper on the rear surface of the PET film; a data printing step (S400) of printing a unique classification code and variable encryption data for each hologram imprinted on the UV coating layer; a protective film coating step (S500) of coating an OPP film on the front surface of the PET film to protect the classification code and the variable encryption data; a scratch printing step (S600) of printing scratch off ink on a portion where the authentication information is printed to be concealed; a guide message printing step (S700) of additionally printing a message for preventing any damage on the scratch (scratch off ink); and a finishing step (S800) of cutting the label manufactured by the respective steps in a desired size or cutting out the label in a form of a sheet or a roll.

The hologram imprinting step (S100) is a process for obtaining an image on a film by applying heat and pressure to an uneven pattern (hologram), in which an ultraviolet coating process of coating a UV coating agent as a UV blocking agent on the PET film continuously fed/transferred along a process line is first performed, and then the PET film is laminated by a master roll having a fresnel mirror lens and a nickel disk imprinted with the hologram to imprint the fresnel hologram on the UV coating layer.

Here, in a process of transferring the fresnel hologram to the PET film for labeling, the UV coating layer having a thickness of 8 to 10 microns is formed on the PET film having a thickness of 15 microns, the hologram imprinted on the UV coating layer is engraved in a depth of 0.1 micron, the fresnel mirror lens is engraved in a depth of 8 microns, and the imprinted fresnel hologram looks like a convex mirror lens.

The thin film depositing step (S200) is a process of coating the metal thin film on the UV coating layer on the rear surface of the PET film imprinted with the fresnel hologram, and particularly, to protect the surface of the UV coating layer as well as to improve sharpness in which the fresnel hologram engraved on the UV coating layer in a transparent state is visually shown more clearly by depositing the aluminum thin plate.

The rear paper bonding step (S300) is a process of coating the adhesive on the rear surface of the PET film and bonding the release paper for protecting the adhesive, in which the release paper is bonded so that the adhesive is not smeared while the adhesive is applied on one surface to be attached in a label form.

The authentication information printing step (S400) is a process of giving unique authentication information to each hologram, in which a classification code used to identify the distribution channels of a product and variable encryption data combined by a variable QR code and an authentication code extracted through an encryption program are given to each hologram and each code serves as an independent authentication device.

The protective film coating step (S500) is a process of coating the OPP film on the front surface of the PET film to preserve the variable encryption data, in which the transparent OPP film is laminated so that the classification code or the variable encryption data (the variable QR code and the authentication code) printed in the authentication information printing step (S400) may not be damaged from an external impact or willfully damaged.

The scratch printing step (S600) is a process of concealing the variable encryption data, in which the variable encryption data combined by the variable QR code and the authentication code to be main authentication information are covered as a scratch so that only an actual purchaser enables one-time authentication.

The guide message printing step (S700) is a process of displaying the guide message to prevent any damage of the scratch, in which the guide message is additionally printed on the scratch formed in the scratch printing step (S600) to prevent the scratch from being willfully damaged.

The finishing step (S800) is a final step of the label manufacturing process to finally finish the label process by cutting the label manufactured by the aforementioned respective steps in size and shape according to a desired specification or cutting out the label in a sheet or roll form according to a user purpose.

The manufacturing and effects of a web authentication hologram label A according to the present invention configured above will be described in detail as follows.

First, a web authentication hologram label A according to the present invention is manufactured using a separate label printing apparatus (not illustrated), and first, while a PET film 1 is continuously fed to the label manufacturing apparatus and subsequently transferred along the process line, a fresnel hologram h may be imprinted on the PET film layer 1 by a laminating method by driving a master roll having a nickel disk (hologram imprinting step: S100).

Here, before the PET film 1 is supplied by the master roll, the PET film 1 first passes through a tank contained with a UV coating agent (liquid) so that a UV coating layer 11 having a thickness of 8 to 10 microns is formed on the rear surface of the PET film 1 having a thickness of 15 microns.

In addition, the fresnel hologram h imprinted on the UV coating layer 11 by the master roll is engraved in a depth of 0.1 micron by the hologram imprinted on the nickel disk of the master roll and engraved in a depth of 8 microns by the fresnel mirror lens imprinted on the nickel disk to look like a convex lens.

Subsequently, an aluminum thin plate is deposited on the rear surface of the PET film 1 imprinted with the fresnel hologram h to form the metal thin film layer 2, and the fresnel hologram h formed on the UV coating layer 11 in a transparent state may be visually shown clearly by forming the metal thin film layer 2 (thin film depositing step: S200).

Subsequently, an adhesive is coated on the rear surface of the PET film 1 subjected to the hologram imprinting step (S100) to form an adhesive layer 3 and simultaneously, the release paper is bonded to the outer surface of the adhesive layer 3 to form a release paper layer 4 (rear paper bonding step: S300).

Thereafter, the unique classification code of the product and the variable encryption data (the variable QR code and the authentication code) are printed on the front surface of the PET film 1 for each hologram by a separate digital printed (data printing step: S400).

Next, for the purpose of preserving the variable encryption data, the OPP film is coated on the data printing layer 5 to form the OPP film layer 6 (protective film coating step: S500).

Thereafter, scratch off ink is printed on the OPP film layer 6 at the portion printed with the variable encryption data to form the scratch printing layer 7 so that the variable encryption data is concealed (scratch printing step: S600). Then, a message for preventing any damage is additionally printed on the scratch printing layer 7 using a separate silk-screen printer (guide message printing step: S700). Finally, the label manufactured by performing the respective steps is cut in a size of a desired specification and cut out in a sheet or roll form (finishing step: S800) and the manufacturing process of the hologram label is finally completed.

Meanwhile, the web authentication hologram label A of the present invention manufactured according to the process steps as such is attached and used to the product for confirming the genuine article and may be authenticated as genuine article through web authentication on a website that automatically links to a designated website when scanning the unique classification code, the variable QR code, and the authentication code printed on the fresnel hologram h using a smart terminal.

That is, by using the web authentication hologram label A according to the present invention, it is possible to clearly determine all distribution histories such as where and how the product is produced, what route and how long the product is supplied to a sales office and displayed and sold through inquiry of information provided in a website automatically linked when scanning the unique classification code of the product printed on the fresnel hologram h, and it is possible to measure the falsification of the authentication information due to the damage to the scratches, thereby enabling the realization of multiple security.

The above description just illustrates the technical spirit of the present invention and various changes, modifications, and substitutions can be made by those skilled in the art to which the present invention pertains without departing from an essential characteristic of the present invention. Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings. The protective scope of the present invention should be construed based on the following claims, and all the techniques in the equivalent scope thereof should be construed as falling within the scope of the present invention.

| Explanation of Reference Numerals and Symbols | |
|---|---|
| A: Hologram label | 1: PET film |
| 2: Metal thin film layer | 3: Adhesive layer |
| 4: Release paper layer | 5: Data printing layer |
| 6: OPP film layer | 7: Scratch printing layer |
| 8: Message printing layer | 11: UV coating layer |
| S100: Hologram imprinting step | S200: Thin film depositing step |
| S300: Rear paper bonding step | S400: Data printing step |
| S500: Protective film coating step | S600: Scratch printing step |
| S700: Guide message printing step | S800: Finishing step |

The invention claimed is:

1. A web authentication hologram label, comprising:
a PET film forming a base member of the label;
a UV coating layer coated on a rear surface of the PET film;
a fresnel hologram imprinted on the UV coating layer;
a metal film layer deposited on the UV coating layer;
an adhesive layer coated on a surface of the metal film layer and a release paper layer coated on the adhesive layer and protecting the adhesive layer;
a data printing layer including a unique classification code and variable encryption data for a product printed on a front surface of the PET film;

an OPP film layer further coated on the front surface of the PET film to prevent damage to the unique classification code and the variable encryption data;

a scratch printing layer coated on the OPP film layer at a portion where the variable encryption data is printed for one-time authentication and prevention of duplicate authentication after the one-time authentication; and a message printing layer additionally printed on the scratch printing layer with a message to prevent willful damage to the scratch printing layer, wherein the metal film layer is an aluminum plate deposited on the surface of the UV coating layer to secure visibility of the fresnel hologram and protect the surface of the UV coating layer.

2. The web authentication hologram label of claim 1, wherein the variable encryption data is a combination of a variable QR code which is encryption authentication information unique to the product and an authentication code additionally printed on the variable QR code.

3. A method for manufacturing a web authentication hologram label, comprising:

a hologram imprinting step of imprinting a fresnel hologram on a UV coating layer which is first coated on a rear surface of a PET film;

a film depositing step of coating a metal thin-plate on the UV coating layer of the PET film imprinted with the fresnel hologram to protect the UV coating layer while improving visibility of the fresnel hologram;

a rear paper bonding step of bonding an adhesive and a release paper on the rear surface of the PET film;

a data printing step of printing a unique classification code and variable encryption data for a product on a front surface of the PET film;

a protective film coating step of coating an OPP film on the front surface of the PET film to protect the classification code and the variable encryption data;

a scratch printing step of coating a scratch printing layer on the OPP film at a portion where the variable encryption data is printed to be concealed;

a guide message printing step of additionally printing a message for preventing any damage on the scratch printing layer; and a finishing step of cutting the fresnel hologram label in a desired size or cutting out the fresnel hologram label in a form of a sheet or a roll, wherein in the hologram imprinting step, the fresnel hologram is imprinted by laminating from a master roll having a nickel disk imprinted with the hologram and a fresnel mirror lens.

* * * * *